July 31, 1956

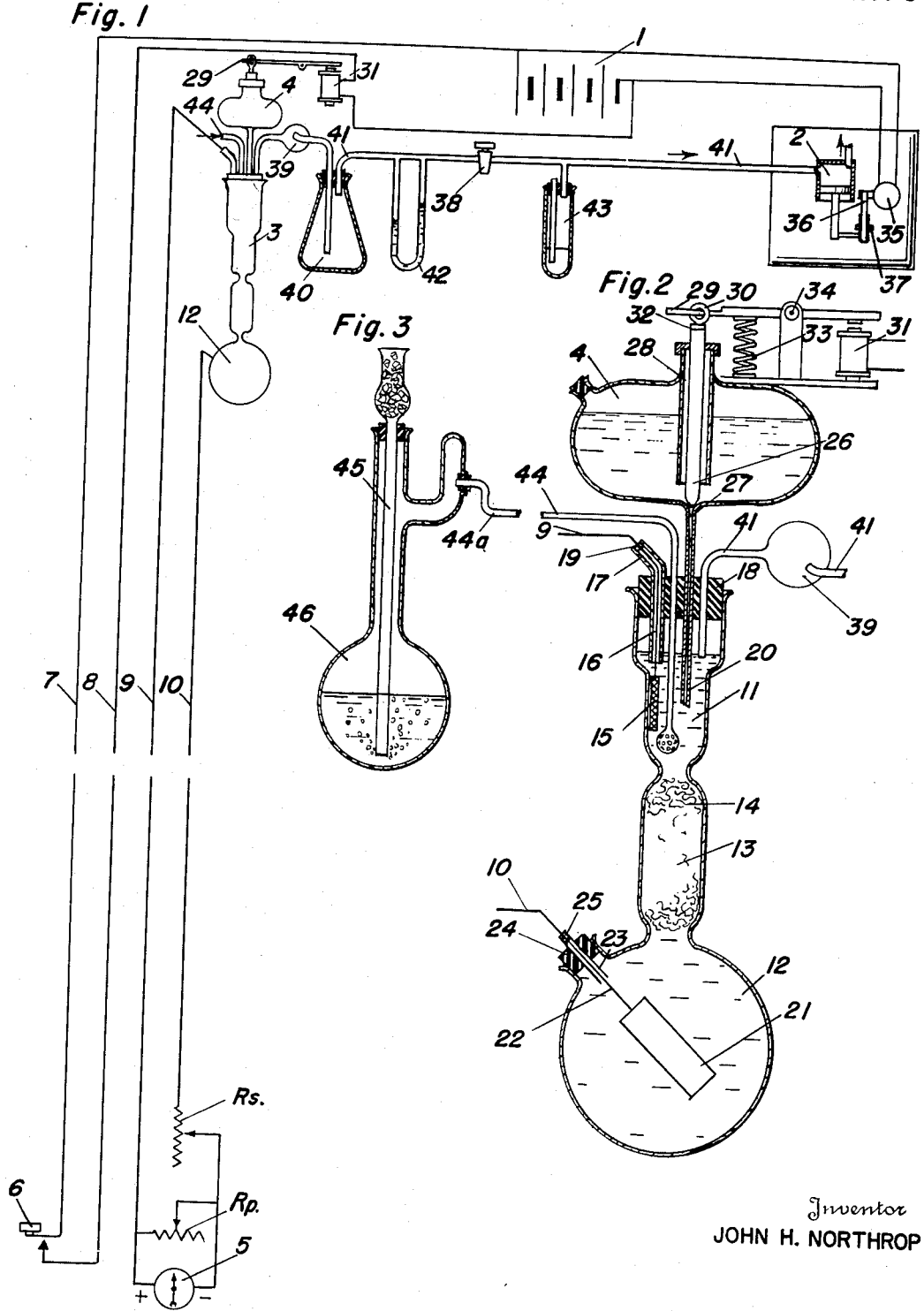

J. H. NORTHROP 2,757,132

METHOD OF ELECTROCHEMICAL ANALYSIS

Filed Dec. 6, 1944

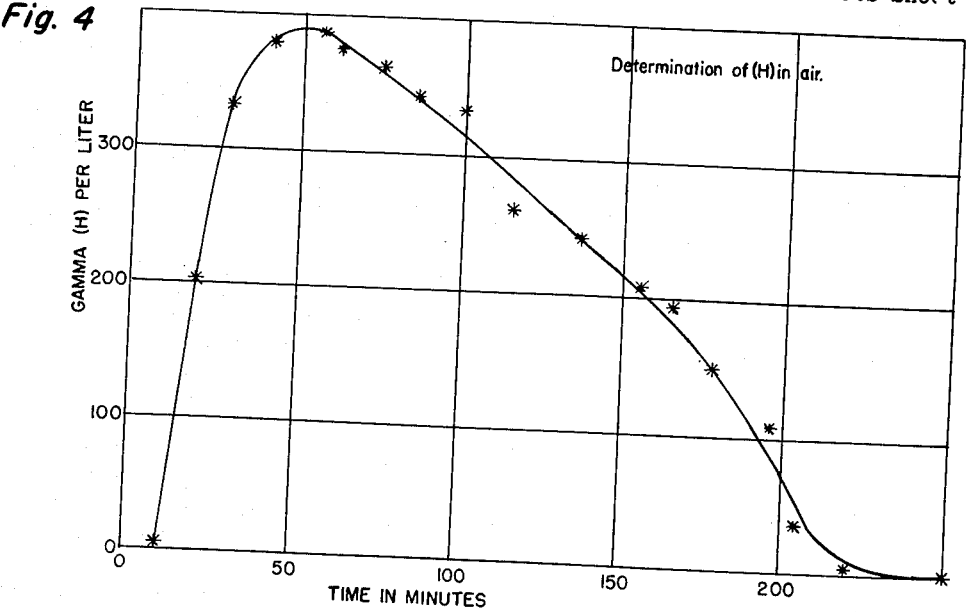

Fig. 7

| OPERATION | VALVE OF REAGENT BURETTE | RECORDING |
|---|---|---|
| (a) Collection of Sample | Closed | |
| (b) Titration Cycle Started | Opened | |
| (c) Titration End Point Reached | Closed | |
| (d) Continuous Titration | Opened and Closed Intermittently | |
| (e) Cyclic Collection and Titration | Closed for Collection Period — Dc<br>Opened for Titration Period — Dt<br>Opened and Closed Until Start of<br>Next Collection Cycle | |
| (f) Lack of Sensitivity | (Closed for Collection)<br>(Opened for Titration) | (f) |
| (g) Too Much Sensitivity | | (g) |

Inventor
JOHN H. NORTHROP

By Fred S. Lockwood
and Henry Berk
Attorneys

July 31, 1956
J. H. NORTHROP
2,757,132
METHOD OF ELECTROCHEMICAL ANALYSIS
Filed Dec. 6, 1944
4 Sheets-Sheet 3
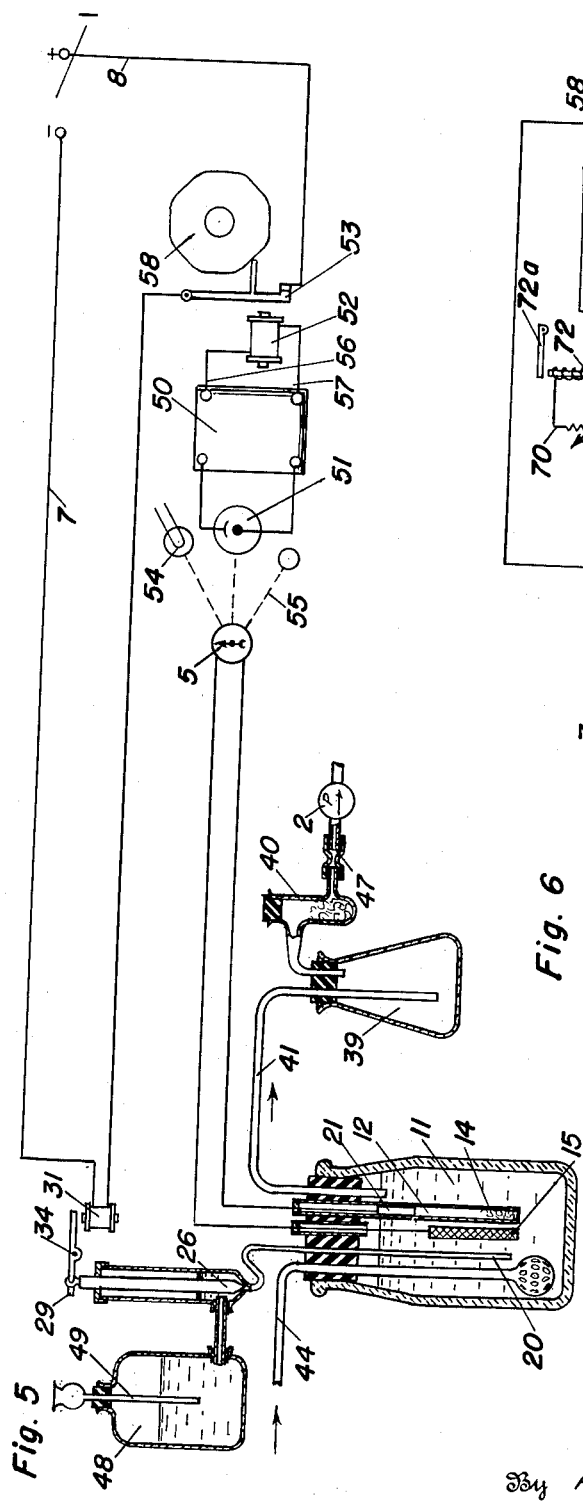
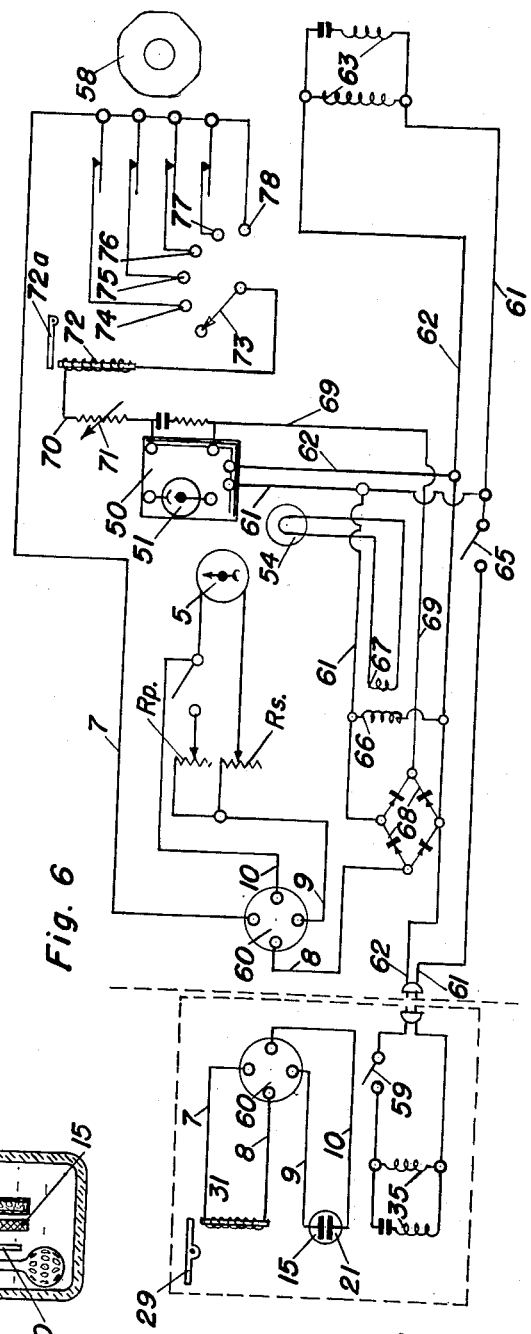
Fig. 5
Fig. 6
Inventor
JOHN H. NORTHROP
By Fred S. Lockwood
and Henry Berk
Attorneys

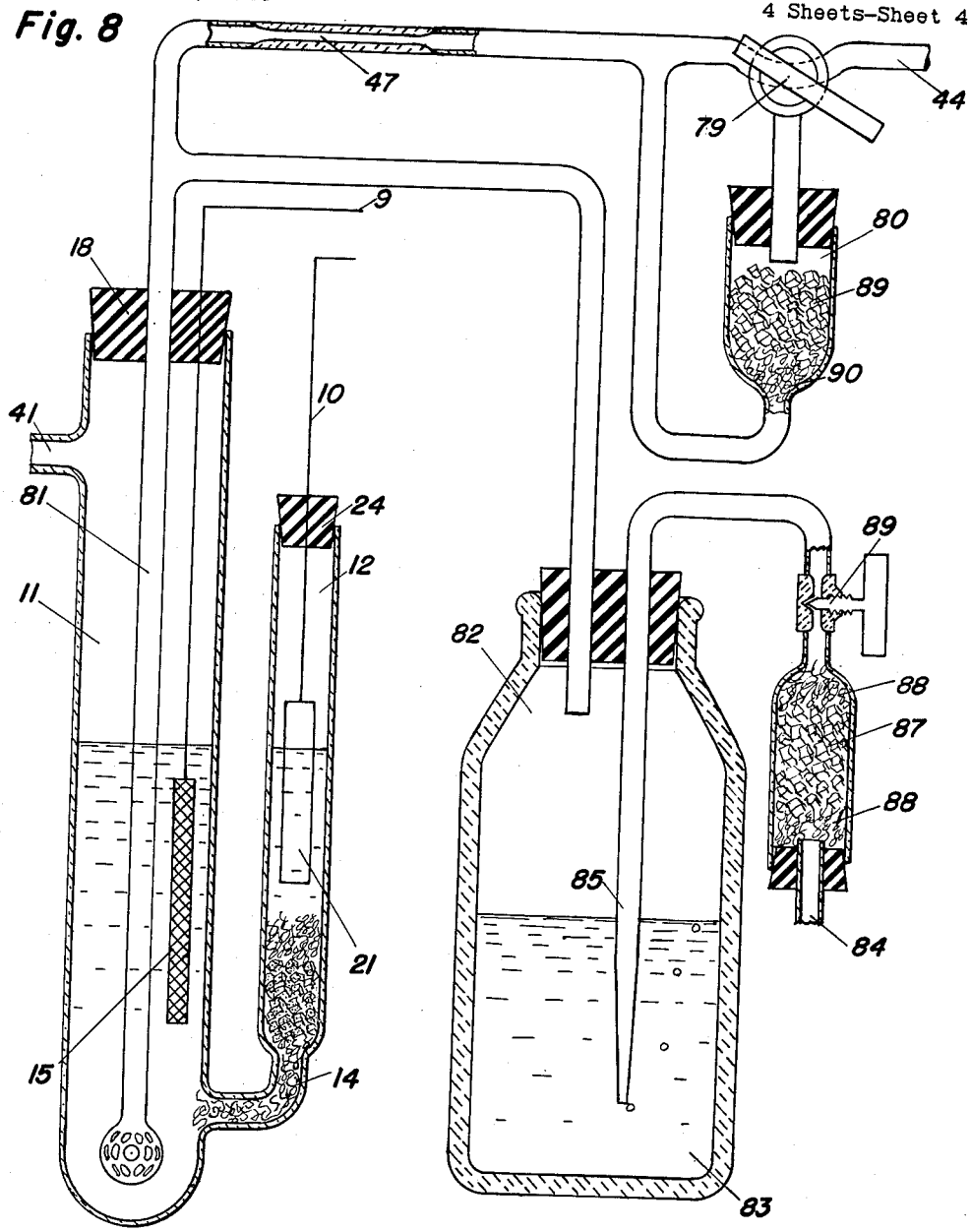

United States Patent Office 2,757,132
Patented July 31, 1956

2,757,132
METHOD OF ELECTROCHEMICAL ANALYSIS

John H. Northrop, Plainsboro, N. J., assignor to the United States of America as represented by the Secretary of War Application December 6, 1944, Serial No. 566,923

16 Claims. (Cl. 204—1)

The invention described herein may be manufactured and used by or for the Government, for governmental purposes, without the payment to me of any royalty thereon.

This invention relates to a method and apparatus assembly useful for conducting chemical analyses by automatic and remote control and particularly for microanalyses of physiologically harmful agents in air.

A difficult and important problem confronting scientific investigators for a long time is the making of accurate and rapid quantitative determinations of chemical concentrations in a given space by remote control so that the determination can be observed with convenience and safety.

The solution to the problem became urgent in determining the concentrations of lethal and noxious agents in air, as, for example, in field and chamber tests in which the concentrations continually change. It also has great value commercially for control of reactions, for warning when the atmosphere in a chemical plant is dangerous, and in a number of other connections.

An object of this invention is to provide a method and apparatus for analyses with which an operator can determine the concentrations of gases or dispersed chemicals at any distance from the place where the concentration occurs.

A further object is to provide a method and apparatus for chemical analyses in which concentration measurements can be made periodically or continuously and by remote and automatic control.

A number of additional objects and valuable benefits of the present invention will become apparent from the following description.

The method depends upon the fact that a wide variety of chemical agents, e. g., noxious agents such as mustard (dichloroethyl sulfide), lewisite, phosgene, diphenylaminechlorarsine and others, may be titrated potentiometrically using a suitable reagent, e. g., bromine or other oxidizing agent, and with suitable electrodes, e. g., platinum. Other reagents, such as aqueous solutions of silver nitrate, may be used in the titration, as, for example, with a silver electrode.

The method preferably makes use of a simple titration technique which depends for reasons which will become apparent as the specification proceeds on the fact that by using a galvanometer connected to a reference electrode and a titrating electrode which will have substantially the same potential at the end point of the titration, an increase in potential at the end point is clearly registered by a marked deflection of the galvanometer.

In a specific embodiment of central importance, air which may be contaminated by a gaseous agent or an agent in an aerosol dispersion is made to flow at a predetermined and measured rate into a titrating cell to which a measured volume of titrating reagent is supplied through remote control and by a time measurement. The potential change which marks the end point of the titration occurs rapidly and is immediately transmitted by electrical means over any desired distance to an indicator, such as a galvanometer.

It may be observed that the term agent is used herein to denote the reactive substance it is desired to detect or having a concentration to be determined. The term reagent denotes the substance used for the detection or as a titrant in the determination. Considering the titration cell as being the unit comprising a titrating electrode, a reference electrode, and an electrolytic solution in which the agent is titrated; the reference electrode may be in the form of a reference half-cell having an electrode immersed in a standardized electrolyte to or from which a titrating electrolyte with an immersed electrode in a titrating half-cell passes current.

The invention will be described in more detail with reference to the accompanying drawing.

In Figure 1 is shown diagrammatically an assembly of a titrator operated by remote control.

Figure 2 shows a detailed elevational view of a titration cell and closely connected elements as they would be used in the assembly of Figure 1.

Figure 3 shows a diagrammatical view of an absorption flask that may be connected into the assembly for selectively removing contaminants from the gas supplied to the titration cell for analysis.

Figure 4 is a graphic representation of analytical results obtained with the present method and apparatus.

Fig. 5 shows diagrammatically a titrator operated automatically.

Fig. 6 is a simplified wiring diagram for an automatic titrator with an automatic recorder.

Fig. 7 illustrates automatic titrator recordings on an enlarged scale.

Fig. 8 shows a detailed elevational view of a titration cell and closely connected components for titration with a gaseous reagent.

Referring to Figure 1, the storage battery 1, pump 2, titration cell 3, burette 4 and associated equipment are located wherever it is desired to analyze the concentration of an agent in air. The galvanometer 5 and switch 6, which controls the burette, are located wherever the observer or operator wishes to be. Four wires 7, 8, 9 and 10 connect the two parts, i. e., the galvanometer and switch, with the remainder of the assembly.

A commercial galvanometer having a sensitivity of $0.115 \times 10^{-6}$ amps. per mm. and resistance of 1,010 ohms is more sensitive than necessary, except for use with certain reagents, such as $10^{-4}$ molar bromine or silver nitrate. The titration method varies somewhat, depending on the characteristics of the galvanometer; but in using this galvanometer, the following directions apply in detail.

The titration cell as shown by the detailed view in Figure 2 is made from a 200 ml. round-bottom heat-resistant "Pyrex" glass to which "Pyrex" tubing of proper size is fused. The exact dimensions are not important. It has been found satisfactory to have the "Pyrex" tubing about 2 cm. in diameter. The smaller the absorption or titrating half-cell 11 in the upper part of the tubing, the sharper is the end point; but if the cell is too small, absorption may be incomplete and the cell contents evaporated too rapidly. The larger the reference half-cell 12 (bottom), the more constant the reference electrode will be. The middle section 13 is packed as tightly as possible with glass wool 14 to prevent mixing of the reference solution with the titrating solution. Increasing the length or decreasing the diameter of this section decreases the diffusion but also increases the internal resistance of the cell and so decreases the sensitivity. A middle section of about 5 cm. in length was found satisfactory. Cells of the type shown have been in continuous use for weeks without sufficient variation to interfere with the measurement.

For the absorption cell electrode 15, a piece of platinum foil or gauze (about 45 mesh) 3 x 5 cm., is welded to a No. 18 platinum wire 16 about 8 cm. long. The electrode is boiled in 1:1 aqueous $HNO_3$, washed repeatedly in distilled water and then held in a Bunsen or alcohol flame in being made ready for use. The wire 16 is passed through a thin capillary glass tube 17 in the cell stopper 18, and the end 19 is sealed with sealing wax or a suitable cement to prevent entrance of air. The electrode 15 should be as far as possible removed from the burette tip 20 to avoid contact with localized excess of reagent.

In some instances, the electrodes may be poisoned or have their sensitivity reduced by certain substances, e. g., high concentrations of arsenic, silver or mercury. If such occurs, the electrode is removed, boiled in nitric acid and ignited as at first. It is advisable to keep several electrodes in nitric acid so that one is always ready for use.

Platinum foil or gold foil may be used but are not as sensitive as platinum gauze. Chlorine and sulfur-containing organic compounds, dichloroethyl sulfide, or the like, do not poison platinum electrodes, but arsenical compounds tend to do so in high concentrations.

In the reference cell 12, the electrode 21 is silver foil, 0.2 mm. thick; and 1 x 5 cm. is welded by means of a Bunsen burner to No. 18 silver wire 22. This wire is likewise passed through a thin capillary tube 23 in a stopper 24 and with a sealed end 25 to prevent entrance of air. In practice it will be found both convenient and desirable to have a number of electrodes kept in readiness for later use by placing them in 1:1 $HNO_3$ until gas is rapidly evolved, washing them repeatedly in distilled water, and thereafter keeping them short circuited in distilled water by either twisting the electrode wires together or by keeping the electrodes in contact with each other by placing them in a narrow tube or bottle filled with distilled water.

Silver electrodes have been in constant use for five weeks in the determination of various concentrations of dichloroethyl sulfide and methyldichlorarsine without loss of sensitivity. Poisoned electrodes may be rendered sensitive again by dipping in nitric acid and treating as before.

The burette 4, from which reagent is supplied at a constant low flow rate through tip 20 to the titration cell, comprises a bulb or flask designed to deliver a liquid to the capillary discharge tip under a constant pressure head determined by the vertical distance in the liquid between the base of the burette and the lower end of a hereinafter referred to tube 28. In operation as the liquid falls in the burette, but still remains above the lower end of tube 28, a suction is produced which draws air downwardly through the tube 28 and into the liquid in the burette where it rises upwardly through and out of the liquid in the same manner as in a conventional Mariotte bottle. The flask may be made of dark glass or be painted black to prevent deleterious effects of light on the contents.

The valve plunger 26 should be carefully ground to seat properly when closed in order to avoid leakage. It may be finished by grinding first with Carborundum and then polishing with white rouge. When properly polished, it should leak less than 0.1 ml. per hour under a head of 30 cm. water. The angle at which the plunger strikes the valve seat 27 should not vary; for this reason the neck of the burette is elongated to receive the hollow tube 28, which has a larger inside diameter than the outside diameter of the plunger 26 and permits air to be drawn into the burette. The attachment of the plunger to the pivoted armature projection 29 should be loose so that the plunger will seat itself correctly and not be thrown out of line by this connection, otherwise the plunger may stick or the valve may tend to leak.

For adjustment of the burette, the screw 30 which controls the height of the movement of the plunger 26, is set so that the plunger is raised 1 mm. when the magnet 31 is in operation. The lock nut 32 on the screw is then tightened against the head of the plunger. If the movement of the plunger is much greater than this, the magnet might fail to operate the plunger; if the movement is much less, the rate of flow of the solution from the burette may be unduly decreased at the valve. The spring 33 which tends to seat the plunger should be as tight as possible and still permit the magnet 31 to operate without any time lag, when the circuit is closed by pressing key 6. If the spring 33 is too tight, the armature 29 might not move on pivot 34; if it is too loose, the burette valve will leak.

The rate of flow of the reagent from the burette is regulated by connecting the burette 4 to the cell with about 30 cm. of capillary tubing 20 having an approximately 0.5 mm. bore. The rate of flow through this capillary tubing should preferably be in the range of 0.5 to 1.0 ml. per minute. There is considerable variation in capillary tubing, and tubes having the proper flow should be selected. If the reagent flows much faster than this, mixing may not be complete during the titration. If the rate is much slower, the titration time will be too long unless a stronger reagent is used. In the latter case, a very small leak will cause a large error and further errors are introduced by evaporation.

A much simpler burette valve may be made by pinching off a 1 mm. rubber tube between the bars of a telegraph sounder. This arrangement, however, requires stronger current and has the further disadvantage that the walls of the tube sometimes stick together, especially after the magnet has been closed for a long time. A preferred type of burette makes use of a Mariotte bottle 48, as shown in Fig. 5.

For drawing the air or gases to be analyzed into the titration cell, it has been found that a toy steam engine acts as a very satisfactory pump. The pump 2 using a diminutive engine of this type requires very little power. A motor 35 of 1/1000 H. P. (requiring 0.1 amp. at 6 volts) is sufficient to give 500 R. P. M. in the pump furnishing about 2 liters of air per minute. A satisfactory motor powered by a storage battery and driving a piston pump, is a commercially available motor used to drive defrosting fans for automobile windshields. The fan head is removed and a belt 36 is run directly on the motor shaft to the flywheel 37 of the pump. The belt is held in place on the motor shaft by discs cut from rubber stoppers and placed on the axle. A satisfactory belt may be made by cutting a 2 mm. strip from the edge of a heavy elastic band.

The running of a small motor may be erratic if the speed is reduced. Therefore, the motor may be allowed to run at full speed, and the volume of air or gases drawn through the cell 11 may be regulated by means of a valve 38. The residual air or gases leaving the titration cell by line 41 flow to an entrainment trap 39 and then should be passed through a trap flask 40 containing an absorption solution or absorbent to protect the pump from corrosive gases. A charcoal filter could also be used as a trap. For prolonged use, it may be necessary to plate the inside of the pump with a corrosion-resistant metal. From the trap flask 40 the air or gases are drawn by pump 2 through tube 41 and flow adjustment valve 38. A manometer flow meter 42 is placed in a position with respect to tube 41 for measuring the flow rate. A constant pressure regulator 43 containing mercury is connected into tube 41 between the valve 38 and pump 2 in order to keep the pump operating at a constant load.

The flow meter 42 is calibrated in the usual manner with a standard flow meter hooked into the inlet of bubble tube 44 so that the manometer reading indicates the rate of flow of gas into the titration cell. The flow meter may be made to register between about 0.2 and 2.0 liters per minute.

Sulfur and chlorine-containing substances, such as dichloroethyl sulfide, do not poison platinum electrodes. Bromine is recommended as a titrating agent for these gases. For simplicity, dichloroethyl sulfide, known commonly as mustard, is symbolized by (H).

The curves obtained in titrating (H) with $10^{-3}$ molar bromine are not typical oxidation-reduction curves in that no definite potential is established during the reaction. It is probable that the primary action is merely an addition of one bromine molecule to each dichloroethyl sulfide molecule. The end point, however, is very sharp. With a highly sensitive galvanometer, it is possible to titrate with $10^{-5}$ molar bromine. When a titration is run as in the present method, the bromine is simply run in slowly until the galvanometer gives a marked deflection. This indicates the end point.

For the purpose of illustration, the following example demonstrates the method of the invention:

EXAMPLE 1

Stock solutions used are: M/10 $H_2SO_4$ and M/100 HCl. The HCl is added to precipitate any silver which may diffuse up from the silver nitrate in the reference cell. The water used to make up this solution must be free from organic matter or reducing agents. Water used should not contain substances which react with bromine, particularly when $10^{-3}$ molar or less concentrated bromine is used.

A 0.2 M HCl solution is saturated with liquid bromine and kept in a glass stoppered brown bottle. This solution is about 0.25 molar bromine and remains nearly constant indefinitely provided excess liquid bromine is present. The bottle is shaken before a sample is withdrawn to be sure that the solution is saturated. The dilute bromine solution used for titrating is prepared by dilution of the stock solution with M/10 sulfuric acid—M/100 HCl. This dilute solution loses strength rapidly if exposed to strong light or is left open to the air. In the closed dark burette 4, the loss is less than 10% in 24 hours.

For filling the titration cell 11, the rubber stopper 18 is removed and the upper part of the cell is filled with the M/10 $H_2SO_4$—M/100 HCl solution. This solution is allowed to drain through the glass wool 14 into the lower part of the cell. The lower bulb 12 is emptied, rinsed with water, then with 0.2 M silver nitrate and filled completely with 0.2 M silver nitrate. A silver electrode 21 is inserted through the side arm of the bulb 12, and the rubber stopper is sealed in with cement or collodion. A platinum electrode 15 is placed in the upper titration cell; and the cell is filled with M/10 $H_2SO_4$, M/100 HCl solution.

The burette 4 is filled with a solution of bromine having the desired strength, depending upon the range of gas concentration to be determined and the time intervals desired for the collection and titration. The solution may be filtered into the burette through a Pyrex sintered glass filter (coarse) in order to remove small particles of solids which might interfere with the burette valve or clog the capillary tube 20.

The desired concentration of the bromine solution is directly proportional to the gas concentration in the air being analyzed and the volume of air passed through the titration cell during the time of collection and is inversely proportional to the time required for titration and to the rate of flow of the titrating reagent. The range of concentration of gas which may be titrated with various concentrations of bromine is illustrated in the following table:

Table I
GAS CONCENTRATION RANGE FOR TITRATION BY VARIOUS CONCENTRATIONS OF REAGENT

| Bromine solution | Dilution of Sat'd solution | 1/10 | 1/50 | 1/2500 |
|---|---|---|---|---|
| | $10^{-3}$ mols per liter | 24 | 1.6 | 0.1 |
| Maximum gas concentration | $10^{-6}$ mols/liter air | 30 | 2 | 0.12 |
| | Gamma (H)/liter air | 4,800 | 320 | 20 |
| Minimum gas concentration | $10^{-6}$ mols/liter air | 0.1 | 0.006 | $4 \times 10^{-4}$ |
| | Gamma (H)/liter air | 16 | 1.0 | 0.06 |
| Resistance in parallel with galvanometer | | 5 Ohms | 50–100 Ohms | infinite |
| Liter air per minute | | 0.2 | 0.2–0.6 | 0.6–2.0 |

1 gamma = $1 \times 10^{-6}$ grams.

With the cell, burette, pump and other parts set up as shown in Figure 1, the pump 2 is started and the air sample flow is regulated to about one liter per minute. The titrating electrode 15 is connected to the positive pole of the galvanometer 5. The resistance in parallel $R_p$ is used with the galvanometer as indicated in Table I. No resistance in series, $R_s$, is used.

The galvanometer needle should come to rest at or near 0 in a few minutes. If a new cell and electrodes are used, however, the needle may be far off either way at first. If it stays positive, add a little thiodiglycol solution; if negative, run in a little bromine reagent from the burette 4. Previously used cells and electrodes should give 0 current almost immediately.

After the galvanometer needle has come to rest at or near 0, the burette valve plunger 26 is raised by pressing telegraph key 6, and time is taken on a stop watch for the galvanometer to swing 10 mm. positive. The burette is then shut off.

After the measurement has been made, the needle should return to 0 in a minute or less due to loss of bromine and polarization. If it does not return to 0 in two or three minutes, the resistance in parallel is too high or the burette leaks. After it has returned to 0, and the burette key 6 is tapped once or twice, the needle should give a sharp deflection at once. If the deflection occurs, the next titration can be made immediately. If the deflection does not occur, the burette must be opened for a few seconds until the galvanometer moves as soon as the key is tapped.

The blank measurement is repeated several times until successive readings do not vary more than 0.5 to one second. First readings with a new cell and electrodes may be erratic. After two or three readings, the time should be constant + or −20%. This blank measurement is 2–3 seconds for $10^{-4}$ molar bromine and is negligible with $10^{-3}$ or more concentrated bromine. It represents the amount of bromine which must be present in the cell to give the deflection used as the end point. A standardized solution of pure thiodiglycol may be used to standardize the burette and bromine solution.

In the standardization, 1 ml. of a known thiodiglycol solution is added to the cell through the air inlet tube, and time is measured for the needle to swing 10 mm. positive as in the blank determination. The burette is closed. After each determination the needle should return rapidly to 0. The burette is then opened again until the needle begins to swing to the positive side. This is done to be certain that all of the gas from the preceding titration has reacted. As soon as the needle returns to 0 again, the next titration can be made.

Duplicate readings should be constant within + or − one or two seconds. The calibration may be obtained with different concentrations of thiodiglycol, if desired. Not more than about 3 ml. of bromine can be run in without a correction for change in volume unless the cell is automatically kept at constant volume. From a series of measurements, figures show that the deviation of a single measurement from the average is about one second and that the quantity of gas titrated per second is constant within + or −10% over the whole range of concentrations.

After the burette has once been calibrated, it is not necessary to repeat the measurement provided the concentration of bromine is known and the same capillary is used with the burette. If very dilute bromine, $10^{-3}$ or less, is used, it is well to standardize the solution against thiodiglycol at intervals.

In some instances, certain substances may be present which interfere with the determination. For example, tobacco smoke contains traces of gas which react with bromine; and the air of a room in which several people are smoking, upon analysis, may be indicated to contain the equivalent of 1–2 gamma (H) per liter. If high concentrations of (H) are being determined, this amount is negligible; but in the determination of low concentrations, the effect of the smoke impurity amounts to a serious error. This error can be eliminated by passing the gas through a purifying train or vessel as shown in Figure 3. The substances in smoke which react with bromine may be greatly reduced by passing the air to be analyzed through soda-lime in the thistle tube 45, then through a 5 M calcium chloride solution at the bottom of the flask 46 into which the lower end of the thistle tube is immersed. (H) itself in low concentration is not absorbed, and the air carrying the low concentration flows out through the side arm tube 44a which may be connected directly to the cell inlet tube 44.

For analysis of gases in air, the titration cell is placed in the desired position and the air flow is regulated as a rate corresponding to the range of gas concentration to be determined. The wires are run back to the galvanometer 5 and to the burette switch 6. The time is noted and titration is carried out as in the blank determination after any desired time interval. The concentration of gas in the air is then calculated as follows:

$$G = \frac{C(T_t - B)}{V \times (T_c + T_t)}$$

wherein:

$G$ = gas concentration, gamma/liter air
$C$ = gamma gas per second titration time (from calibration)
$V$ = liters air per minute
$B$ = titration time in seconds for blank
$T_t$ = titration time in seconds for gas
$T_c + T_t$ = total collection time in minutes, i. e., time from end of preceding titration to end of present titration.

As an example of determinations with high concentrations of (H): air was bubbled through liquid dichloroethyl sulfide and mixed with pure air. The flow rates were measured by flow meters. The bromine concentration of the titration solution was about $2 \times 10^{-3}$ M. The burette rate was 0.65 ml. per minute. The galvanometer had a sensitivity of $0.12 \times 10^{-6}$ amps. per mm. and was hooked up with 50 ohms resistance in parallel. Gamma (H) per liter saturated air at 23° C. = 780. Results are tabulated in the following table:

Table II

CALIBRATION FROM 6 RUNS

[Average gamma per second titration time = 5 i. e., C = 5 (with correction)]

| Total Collection time in minutes, $T_c + T_t$ | Liters Air/min. | | Titration time, Sec. $T_t$ | Total Gamma (H) $C \times T_t$ | Gamma (H) per liter total air G | Gamma (H) per liter air sat'd by (H) |
|---|---|---|---|---|---|---|
| | Total V | Saturated with (H) | | | | |
| 11 | 1 | .05 | 66 | 330 | 30 | 600 |
| 5 | 1 | 0.10 | 75 | 375 | 75 | 750 |
| 5 | 1 | 0.10 | 78 | 390 | 78 | 780 |
| 4 | 0.8 | 0.21 | 128 | 640 | 194 | 740 |

Similarly, determinations were made of low concentrations of (H) in air. Using a $10^{-4}$ molar bromine titrating solution, the following values were obtained:

Table III

| Gamma (H) per liter: | | | | |
|---|---|---|---|---|
| Taken | 0.16 | 4.0 | 11 | 40 |
| Found | 0.18, 0.20 | 3.5, 5.0, 4.5 | 10, 14, 12 | 42, 45, 41 |

Figure 4 graphically shows the results of an experiment in which 24 mg. (H) were placed on filter paper in a 2½-liter vessel and 0.5 liter per minute was drawn through the vessel into the titration cell. Analyses were carried out with the titration cell, and 26 mg. (H) were found in the complete analyses.

It is also possible to titrate mixtures of gases by selective reagents. For example, arsenic compounds may be titrated potentiometrically with iodine in the presence of compounds containing sulfur and chlorine, such as dichloroethyl sulfide, which do not react with iodine.

The galvanometer and stop watch are in use only while the titration is being carried out. It is, therefore, possible for one operator at a central point to titrate a series of samples collected by different pumps and cells located at any desired point or several points removed from the operator. The number depends upon the frequency with which the titrations are required. For instance, if it is desired to have an analysis every 10 minutes and it requires 1–2 minutes to make one analysis, a single operator can handle 5 titration cells consecutively. If an analysis every 30 minutes is sufficient, he can handle 15 titration cells. The wires from the various titration cells and burettes lead to the operator and may be connected to the galvanometer and burette switch when the titrations are to be made.

With the same method and assembly as described, the galvanometer may be replaced by various types of signalling devices, such as lamps, sounding instruments and automatic controlling devices. Similarly, the operator's burette switch may be replaced by an automatic timing device which opens and closes the burette periodically. Accordingly, the assembly can be made fully automatic for giving a warning signal or for controlling the concentration of particular gases. Such automatic devices which carry out the titrations and record the results have been devised, tested, and have been proved to be highly useful.

Substantially the same kind of cells and basic principles of operation are involved in the automatic titrator as in the remote control titrator which has been described.

The automatic titrator apparatus as illustrated by the simplified diagram of Fig. 5 may comprise a half-pint milk bottle for containing a titration cell 11 with its titration electrode 15 and a reference cell 12 with its electrode 21, a gas sampling tube 44 for leading a gaseous sample to be analyzed into the titration cell 11, a pump 2 for exhausting gaseous fluid from the titration cell 11 at a constant low flow rate together with excess liquid in maintaining a substantially constant volume of electrolytic absorbent in titration cell 11, a burette capillary tube 20 for passing a fluid titrant to titration cell 11 at a constant low flow rate with an electromechanically operated valve 26 for interrupting the flow of the titrant periodically. In these respects the automatic titrator may substantially duplicate the apparatus of the remotely controlled titrator illustrated in Fig. 1.

It is to be understood that the form of each component may be varied, e. g., the titration cell may be made larger for titrating gas difficult to absorb or smaller to give increased sensitivity for gases which are easily absorbed, etc. The ordinary milk bottle is a sturdy, inexpensive, suitable cell container. The pump 2 may suitably be equipped with a constant speed 110 volt A. C. motor connected thereto through changeable gears to obtain air flow rates adjusted and inducing the flow of 0.2, 1.0 or 2.0 liters per minute. For insuring a constant low flow rate, a critical orifice, a small calibrated capillary tube 47 may be used in the line between the pump 2 and trap 40, in place of flow meter 42 and regulator 43. The constant flow rate burette with an electrically controlled valve is preferred in the form of a Mariotte bottle 48 which holds the titrant liquid under a pressure less than atmospheric and has an air inlet tube 49 dip into the titrant liquid at a certain level so that the titrant liquid flows at a definite constant rate through the valve controlled capillary outlet 20 as determined by the head of liquid from the tip of the air inlet tube 49 to the outlet tip of the capillary tube 20 with a constant liquid level in cell 11. Absorption tube 40 may be used following trap 38 to remove entrained liquid and vapor.

For automatic control of the burette valve, a photo cell 51 connected to a relay 52 is arranged through a circuit 50 to be actuated by a predetermined deflection of the galvanometer 5 for energizing the circuit of magnet 31; and in addition thereto, as will be explained in more detail, a timed intermittent switch 53 associated with motor driven cams 58 prevents the magnet circuit from receiving power from source 1 to open the burette valve during a gas sample collection period.

The apparatus diagrammatically illustrated in Fig. 5 operates as follows: air is drawn through the absorption electrolyte in titration cell 11 by means of pump 2 and critical orifice 47 at a constant flow rate in the range of about 0.2 to 2.0 liter per minute depending on the gear and orifice used. The galvanometer 5 connected between the cell electrodes 15 and 21 is adjusted so that a beam of light 55 reflected from a mirror on the galvanometer pointer strikes at 0 about 2–3 cm. away from the photo cell eye 51, with no or a definitely minute amount of current passing through the galvanometer 5. When the beam is in this zero position and switch 53 is closed, the burette valve is open to allow the reagent to run into cell 11 until the galvanometer mirror is deflected so that the reflected beam strikes the eye of the photo cell 51, which then operates the relay 52 by passage of current through wires 56 and 57 to close the burette valve by disconnecting the switch 53. The current in the galvanometer circuit is then decreased owing to polarization or to the loss of the excess reagent, as when bromine is used, and the beam returns to the zero position to again let relay 52 release the switch 53 for energizing the circuit of the burette valve magnet 31 if cam 58 permits contact of switch 53.

If a gas which reacts with the reagent is present in the air sample drawn through the titration cell, the galvanometer pointer returns to zero more rapidly than in the absence of the gas and thus the burette valve magnet 31 should operate very promptly to shut off the flow of titration reagent at the end of the titration, but this effect is not sufficient for a quantitative method. For this reason, it was found desirable to use a time cycle switch in the circuit of the burette valve magnet. When the time cycle switch 53 is opened by cam 58 the gas sample collects in the cell 11 but is not titrated, because the burette valve magnet circuit 7–8 is open and the burette valve remains closed. When cam 58 allows switch 53 to close, the burette valve magnet 31 is subject to operation of the photo cell relay 52, so that the reagent runs into the titration cell 11 until the absorbed gas therein is titrated; and when the titration is finished, excess reagent produces a current which promptly deflects the beam from the galvanometer to the photo cell eye, whereupon, relay 52 attracts switch 53 into the open position.

Since the rate of flow of the gas sample to be analyzed and of the reagent are both known, the amount of reagent from the time of flow and, hence, the concentration of the reactive ingredient in the sample to be analyzed may be readily calculated.

An important and advantageous feature of the method is that the final electrometric determination does not depend upon the potential value for any concentration of the agent being determined or even on a specific potential set up by any concentration of the reagent. The final determinations are accurately dependent on the amount of reagent used to obtain a large deflection when the potential of the titrating electrode is brought back to the potential of the reference electrode, as will be explained more concretely with reference to the titration of (H) with bromine.

Theoretically, bromine reacts with (H) to form an addition compound $(ClCH_2-CH_2)_2SBr_2$ which decomposes slowly to form the sulphoxide. The bromine reaction is not a reversible oxidation reduction reaction, and hence no definite potential is set up. Thus, the potential of the platinum titrating electrode in dilute sulfuric acid need not be definitely affected by addition of (H) nor by the subsequent addition of bromine so long as excess (H) is present. Under these conditions the potential is indefinite, but the titrating electrode comes rapidly to the potential of the reference electrode as soon as the galvanometer circuit is closed in the cell written:

| Ag | AgNO$_3$ | H$_2$SO$_4$ HCl | Pt |
|---|---|---|---|
| Reference | | | Titrating |

As soon as all the (H) has reacted, any excess free bromine gives rise to a large positive potential, indicating the end point of the titration. The final value of the potential therefore depends only on the $Br^0/Br^-$ ratio. The reaction with thiodiglycol or hydrolyzed (H) solutions is the same as that with (H) itself, hence thiodiglycol standardized for its equivalent (H) value may be used to calibrate the apparatus and standardize the titration reagent.

When more concentrated (H) solutions are titrated with bromine, the potential difference between the cell electrodes rises gradually at first and then rapidly; and, for this reason, it is necessary to decrease the sensitivity of the galvanometer so that the end point corresponds to a higher potential difference than with dilute bromine.

Since there is no change in definite potential difference when excess (H) appears in the solution, it is necessary to set the galvanometer and relay circuits so that the bromine reagent runs into the cell to start the titration regardless of the amount of (H) reactant collected in the titration cell. When no (H) gas is present, even a trace of the bromine reagent gives a large deflection and the burette is closed immediately. The potential then decreases rapidly due partly to polarization and partly to loss of bromine swept from the cell by the incoming gas sample. This results in a repeated addition of small amounts of the bromine reagent and gives a characteristic record as shown in Fig. 7 (d). This procedure between a titration and subsequent collection of sample has the following advantages: (1) it indicates at once that the apparatus is working properly since any break in the circuit or other cause of failure results in a different kind of recording; (2) replenishes loss of solution from the titrating half-cell; (3) renews the composition of solution in the titrating half-cell for the start of the collection at a predetermined initial point.

In the wiring diagram of Fig. 6 for the automatic titrator there may be considered to have the following main circuits; the circuits of the titrator unit; the control case power circuit; the optical circuit; and the recorder unit circuit.

The titrator unit, which may be used without the automatic recorder, comprises the cell having a titrating electrode 15 and reference electrode 21 connected to their respective wires 9 and 10, an electromagnet 31 for operation of a burette valve attached to the armature projection 29 when current flows through wires 7 and 8; and a synchronous motor circuit 35 for a pump with a toggle switch 59 in one of its connections to a source of alternating current. For convenience in hooking up the titrator unit circuit with the circuit of an automatic recorder in an optical circuit, a four contact chassis connector 60 is connected to the wires 7, 8, 9, and 10 so that it can be plugged into a corresponding connector of the control case circuit including the recorder unit, the photoelectric cell, and the galvanometer.

The control case power circuit need have a power intake only through a pair of wires 61 and 62 from a generally available source of 110 v. 60 cycle A. C. source. These wires furnish current to a synchronous motor 63 used for rotating a recorder drum (not shown) and for actuating intermittent switches in the circuit of the burette valve magnet through cams 58. When toggle switch 65 is closed in line 61, the circuit is completed for operation of motor 63, and at the same time, a circuit is completed from wire 61 through a primary transformer coil 66 to supply current for illumination of light bulb 54 in the transformer secondary coil circuit 67, alternating current is supplied to bridge rectifier 68, and the alternating current power circuit of the photoelectric cell unit 50 is completed. The photoelectric cell unit 50 may be of a type which has a selenium cell that varies electrical resistance with the light intensity and includes an amplifier.

The circuit 50 of the photo-cell may be that of an ordinary amplifier operated by alternating current and with a relay as its load. In such a circuit, the photo-cell upon being illuminated passes more current to open a relay, which on opening breaks contact of wires 69 and 70 in the burette valve magnet circuit 7–8.

Through the four contact chassis connector 60 wire 8 of the burette valve magnet 31 in the titrator unit is attached to one direct current pole of the bridge rectifier 68. At the opposite direct current pole of rectifier 68, wire 69 conducts the current to the photoelectric cell unit for making a contact with wire 70 when the light beam from lamp 54 is on the photo-cell eye. Between the wires 69 and 70 may be placed a resistance, e. g. 2,000 ohms and a capacitance, e. g., of .005 mfd. The wire 70 completes the circuit between wires 8 and 7 of the burette valve magnet through a variable resistance 71 a relay induction coil 72, a selector switch 73, and periodically through one of several cyclically operated contacts 74 to 77 inclusively, are operated by cams 58 to permit contact only during certain periods, e. g., 2 minutes during a 3 minute cycle, 6 minutes in a 12 minute cycle, 10 in a 30 minute cycle, and 10 in a 60 minute cycle, respectively. The time interval in the cycle that contact is permitted is the time allowed for titration while the remaining interval in the cycle is the time allowed for collection during which the burette valve will not be opened even though the photo-cell 51 would allow current to pass from wire 69 to wire 70. When the selector switch 73 contacts connection 78, the opening and closing of the burette is controlled entirely by the photo-cell, and this is the connection advantageously used in calibrating with a standardized solution since it is unnecessary in this operation to have time for a gas collection.

The galvanometer 5 in the automatic titrator control case is connected between 9 and 10 leading from the electrodes through the chassis connectors with adjustable resistances $R_p$ in parallel and $R_s$ in series just as the galvanometer is connected in the remotely controlled apparatus shown in Fig. 1. The galvanometer 5 is designed to have a mirror reflect a beam of light from lamp 54; and upon deflection of the beam from a zero position to the eye of the photocell, the galvanometer circuit is energized by the presence of free bromine in the titrating half-cell.

The armature 72a is actuated to movement by the magnet 72 whenever current flows into through wire 70 in the completed burette valve magnet circuit and by this operation a recording pen connected to armature 72a makes a marking on a recording drum indicating each time the burette is opened or closed. By proper arrangement of the recording drum in relation to the recording pen, distinctive recordings obtained when the apparatus is in operation are shown in Fig. 7, wherein recordings (a) to (d) characterize different periods of operation, recording (e) characterizes a complete analysis, (f) indicates incomplete titration, and (g) indicates that the valve closed prematurely during the titration due to excessive sensitivity.

The operation of the automatic titrator being the same in principle as the remotely controlled titrator described, the electrolytes for the cells and the titrating solutions are prepared in proper concentrations for use in the apparatus for the resistances, the pump rate, and the time cycle selector setting in a similar manner depending upon the kind and concentration of the agent to be analyzed. The percentage of agent absorbed in the titration electrolyte depends on the concentration and on the rate of gas sample flow. The greater the concentration, the longer the collection time and the greater the rate of air flow, the less complete is the absorption. The absorption is about 95% complete when the (H) gas concentration is below 10 gamma per liter. As previously indicated, the proper reagent concentration is proportional directly to the flow rate of the sample, the time of absorption and the concentration of the agent in the sample and inversely proportional to the flow rate of the reagent solution and the titration period.

When the agent concentration of the agent in the sample is entirely unknown, the titration will not be complete if the reagent concentration is too low or the titration period is too short and this will be evidenced by the recording (f) shown in Fig. 7. Then the condition can be remedied by increasing the reagent concentration, shortening the titration period, reducing the amount of agent collected, reducing the reagent flow rate or any combination of such variations.

The final calculation of the gas concentration is obtained from a recording as shown in Fig. 7 (e) in accordance with the formula that the quantity of the agent titrated is equal to the distance of the continuous raised line which marks the period of titration in terms of the calibration value. In using a recorder drum 60 cm. in circumference and rotating one complete revolution in an hour, each cm. on the drum is equivalent to one minute. The pen may be set to drop 5 mm. an hour and the whole record thus made to cover 24 hours with the paper marked in cm. and mm. The volume of gas sample containing the agent to be analyzed is the distance in cm. covered by the collection time plus the titration time multiplied by the known rate of sample flow in liters per minute since 1 cm. is equal to 1 minute. Thus, the formula for calculating the concentration is as follows:

$$G = \frac{K}{VA} \frac{D_t}{(D_t + D_c)}$$

$G$ = concentration, gamma agent per liter.
$K$ = calibration value, gamma agent titrated in one cm.
$D_t$ = titration time, cm. distance of raised continuous line.
$D_c$ = collection time without titration, cm. distance of continuous low line.
$D_t + D_c$ = total collection time.
$V$ = liters sample per minute or per cm.
$A$ = percentage of agent absorbed.

With a fixed sample flow rate and titration rate, the K and V are constants for the whole record. Thus, the determination can be carried out continuously without further attention except to keep the burette suitably filled, replacing paper on the recorder drum every 24 hours and occasional servicing of the apparatus. With the continuous recording, a determination is made of the average agent concentration during each collection cycle throughout the continuous operation.

If the sample contains substances other than the agent to be determined, which react with the reagent, such substances may be selectively eliminated from the sample as previously indicated by an absorption or purification prior to passing the sample into the titration cell. The final accuracy of the determination may be affected slightly by several factors but be corrected for these factors as, for example, the degree of absorption. Other experimental errors may be corrected in the calibration; and with accurate reading of the recorded time for properly determined rates of flow, the experimental error can be held down to a small permissible per cent.

A wide variety of heteroatomic agents may be similarly titrated with bromine as, for example, ethyldichlorarsine, chlorvinyldichlorarsine, and phenyldichlorarsine.

In general, any agent which liberates chloride ions in solution or which gives an insoluble precipitate with silver can be titrated electrometrically in accordance with present invention by using silver nitrate and a silver titrating electrode. The silver electrode has the advantage that it is not readily poisoned and will titrate a number of agents which do not react with bromine, e. g., phosgene, chlorine, and hydrocyanic acid.

In using the silver electrode, the titration cell is the same as for the bromine except for the electrode and electrolyte solutions. Satisfactory electrolyte solutions for the titration cell are formulated by making up one liter of solution containing 0.1 M potassium nitrate, 0.1 M sodium oxalate and 0.01 M silver nitrate, and a second 1-liter solution of 0.1 M potassium nitrate, 0.01 calcium nitrate, M/100 nitric acid and 1% calcium carbonate. In the last mentioned solution the 1% $CaCO_3$ serves to maintain a constant pH and tends to keep neutralized any slight acidity which might otherwise be caused by the weak nitric acid. The first solution is used to fill the reference half-cell and the second solution is used in the titrating half-cell. The silver ion concentration in the reference half-cell solution should be about equal to the silver ion concentration in the titrating half-cell solution at the end point of the Ag-Cl titration. The titrating reagent may be a silver nitrate solution of strength required and containing 0.1 M potassium nitrate.

If the agent analyzed tends to react and form gas not completely absorbed by the electrolyte in the titrating half-cell, it may be desirable not only to use a larger titration cell, but also to add a small amount of substance which increases the absorption. For example, phosgene reacts rapidly with water to form carbon dioxide and hydrochloric acid. To obtain absorption of the phosgene products of reaction 1 g. p-chloraniline is added to a 100 ml. titration cell. The phosgene readily reacts with the p-chloraniline liberating two chloride ions. The phosgene may be preliminarily purified by bubbling through a solution of concentrated sulphuric acid and silver sulphate to remove hydrochloric acid in determining the concentration of the phosgene free from hydrochloric acid.

It is not necessary for the substance analyzed in the titration cell with a silver electrode to liberate chloride ions. Hydrocyanic acid reacts with silver nitrate to form silver cyanide and may be titrated in the same way as an agent which liberates chloride ions. Even though the hydrolysis of a substance is relatively slow in liberating chloride ions, as in the case of dichloroethyl sulphide, a steady state is soon reached during the absorption.

The analyzing device employing principles which have been explained, may be constructed in a more compact form to make the apparatus portable and sturdier for operation in the field. For such a purpose, as well as in certain other circumstances, the titrating reagent is advantageously delivered to the titration cell in gaseous form at a constant low flow rate rather than liquid form. Also, it is advantageous to have the instrument give a rapid determination within a relatively narrow range, and furthermore, the titration by a gaseous reagent concurrently with absorption of the sample reduces slippage, i. e., loss of unabsorbed agent.

Briefly, in an application of the invention with the use of a gaseous titrating reagent, a slow stream of air or other gaseous carrier containing a known low concentration of a halogen or similar reagent in gaseous phase is bubbled through an electrolytic absorbent in a titrating half-cell and a sample of air or other gaseous material to be analyzed is bubbled through the absorbent in the same cell at a constant low flow rate. The presence in the sample of dichloroethyl sulphide (H) or other such gases which react with the halogen or titrating agent decreases the flow of current through the cell, and within limits a concentration of the (H) or other agent in the sample is measured by a reading of an ammeter in the circuit between an electrode in the titrating half-cell and a reference electrode. The method and apparatus will be described in more detail with reference to Fig. 8 in the drawings.

Referring particularly to Fig. 8, the vertically elongated titrating cell tube 11 is connected at its base to a relatively shorter reference cell tube 12. A platinum electrode 15 is immersed in the titrating solution at the bottom of the titrating cell 11 and a silver electrode 21 in the reference cell tube 12 is immersed in a standardized reference cell solution. Both electrodes are connected through a micro-ammeter with a 0–50 micro-ampere scale or through a galvanometer with a suitable scale, e. g., 0.5 microampere per mm. with 500 ohms shunt resistance. The micro-ammeter is preferred, because the galvanometer is more sensitive to vibration.

A sample stream of air or gas to be analyzed is introduced to the titration cell from sampling tube 44 by an arrangement of a valved by-pass 79 which permits the sample to flow directly into the absorption solution in titration cell 11, or indirectly thereto after being diverted through purifier 80. The gaseous stream of titrating reagent may be passed into the absorption solution through the same bubbler tube 81 from a mixing flask 82, containing the titration agent in liquid form or in a liquid composition 83 which readily evolves the gaseous reagent and being provided with a controlled inlet 84 for a gas which is to act as a carrier and diluent for the gaseous type reagent, as for example, the bubble tube 85 having a narrowed tip of about 2 mm. I. D. at its exit, an absorption purifying material at its inlet and a finely adjustable valve, such as needle valve 89 for controlling the flow of purified gas into the saturation solution 83. The flow of gases, including both the sample from tube 44 and diluted gaseous titrating reagent from flask 82 into the titrating cell 11 is obtained simply by connecting a suitable pump, such as a vibrator or a toy engine pump described with reference to Fig. 1, to the outlet tube 41. The tubes for conducting the gases into and out of the mixing flask and the cells, also the electrodes in the cells are sealed tightly in passing through stoppers which are clamped in place after the cells and mixing flask have been charged with suitable solutions.

The following example is given on the use of the apparatus for determining the concentration of dichloroethyl sulphide in air. The titration and reference cell are made up to have the following relation of electrodes and electrolytes:

| Pt | 20 ml. 0.25 M $H_2SO_4$ | | |
|---|---|---|---|
| Air bromine, | 0.01 M HCl, | 0.10 M $AgNO_3$, | Ag |

EXAMPLE 2

Platinum gauze 45 mesh 0.0085 inch wire diameter, 1 x 5 cm., is used as the titrating electrode. A mixing flask solution for supplying a low concentration of bromine to a stream of purified air is made by diluting 10 ml. of a borate solution containing 0.4 M boric acid (25 g. $H_3BO_3$) and 0.5 M sodium hydroxide per liter to 100 ml. with distilled water and dissolving into the resulting solution 0.10 ml. liquid bromine. Consecutive layers of soda lime and charcoal 87 between pads of glass wool 88 are used for purifying air passed into the mixing flask 82 at the rate of about 0.1 liter per minute. Charcoal is used in purifier 80. When the cell is set up with the solutions and purifiers in the proper places, the method of operation is as follows: A pump is run to exhaust gas from the titration cell at a rate of 1 liter per minute through outlet 41. The stop cock 79 with a 3 mm. bore is turned so that air from sampling tube 44 is by-passed through charcoal in the purifier 80. No air should bubble through the bromine solution in the mixing flask 82, for if it does the charcoal 89 or glass wool 90 is packed too tightly in the purifier 80. Stop cock 79 is gradually closed until the ammeter remains constant at 44—46 for at least two minutes, with purified air bubbling through bromine in the saturator at the rate of 5–10 bubbles per second. If more air is required, the electrode is not sufficiently sensitive or the bromine solution is too weak, but both can be corrected. A critical orifice tube 47, e. g., a capillary 4 cm. long and 1 mm. (I. D.) for 1 liter 1 min., acts as a constant gas flow rate regulator.

With the apparatus operating at suitable equilibrium so that the ammeter registers a constant reading, say 45 micro amps., the stop cock 79 is turned rapidly so that the air sample to be analyzed enters the titration cell directly. The ammeter pointer makes a sharp deflection, jumping to 50, and returns to the equilibrium point of 45 in a few seconds. The apparatus is now ready for use in making an analysis.

Air to be analyzed is passed directly into the titration cell together with gaseous reagent from the saturator 82 regulated so that the ammeter reads 45 micro-amps. With pure air, this reading remains constant but with the presence of (H) or other gases which react with bromine the current decreases as the concentration of these substances in the air sample increases, as for example 20 gamma of (H) per liter decreasing the current from 45 to 10 micro-amps. in about 10 seconds. Accordingly, a calibration curve may be made by plotting the gamma of (H) per liter against the meter readings or the approximate concentration of (H) in the sampled air may be calculated from the proportional time for a certain reduction in current. For example, with no (H) present in the sample of air, the ammeter reading remains at 45; with a concentration of 20 gamma per l. of (H) in the air, the ammeter reading will change to 10 in about 10 secs.; with a concentration of 50 gamma per l., the ammeter will change from 45 to 10 in about 4 secs.; with a 100 gamma (H) per l. the 35 micro-amps. change takes place in about 2 secs.; thus a calculation may be made with the formula of CT value, wherein C is the concentration of H in gamma per l. and T is the time in seconds for a 35 micro-amps. change. In this instance the CT value for the cell equals approximately 200.

With the same kind of titration cell but using a hypochlorite solution e. g. 10 ml. hypochlorite plus 1 ml. 0.3 M. acetic acid in place of the hypobromite in the mixing flask 82 a detection or determination of chlorine in an air stream may be made.

EXAMPLE 3

A slow stream of air, about 0.1 liter per minute, containing chlorine from the mixing flask 82 is passed through the titrating half cell of the following cell:

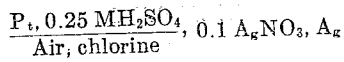

The electrodes are connected to a 50 micro-ampere galvanometer and the air stream containing chlorine is adjustable to give constant current of about 25 microamperes, assuming that the CT value for the cell is about 250 gamma per liter-seconds, i. e. 5 gamma per liter gives a 5 micro-amp. change in reading in about 1 minute.

Air to be analyzed is also bubbled into the same half-cell through stop cock 79. If the air to be analyzed contains chlorine, the current increases. If the current decreases, the air analyzed contains a gas, such as (H) which reacts with chlorine. The approximate concentration of chlorine or of a gas which reacts with chlorine in the air analyzed may be calculated on the basis of a preliminary calibration. For instance, the approximate concentration of (H) in the air sample is found by dividing the time in seconds required for a 5 micro-amp. change into the CT value 250.

In place of the foregoing procedure for determining varying concentrations of an agent through the measurement of time for a certain decrease of current, the titrator may be used to indicate a concentration of the agent by direct reading from the meter or any variation from a definite concentration by altering the sensitivity of the apparatus for any desired specific range of concentrations.

The larger of the titrating electrode and the more sensitive the meter, the lower the concentration of the agent required to reduce the current to zero or to any desired end point reading, taking into consideration that the sensitivity also depends on the rate of agent collection, the rate of titration, and the volume of the electrolyte. Practically, the air or sample flow cannot be changed very much. If a flow rate of less than about 0.2 liter per minute of sample air is used, the meter fluctuates owing to poor stirring; if more than about 1 or 2 liters per minute is used, there is too much evaporation, and the electrolyte tends to be carried out of the cell by foaming. The final reading of the meter is practically independent of the volume of the electrolyte, but the time required for the reading to change is nearly proportional to the volume of the electrolyte.

Conditions found for various ranges of (H) concentrations are summarized in the following table:

Table IV

CONDITIONS FOR DETERMINATION OF VARIOUS RANGES OF (H) CONCENTRATION

| Concentration range for direct reading, Gamma H per liter | Electrode Size, cm. | Ml. borate | Ml. bromine | Shunt resistance | CT value for 35 divisions |
|---|---|---|---|---|---|
| 0–10 | 1 x 5 | 10 | 0.1 | ---- | 200 |
| 0–30 | 2 x 5 | 10 | 0.1 | 300 | 800 |
| 0–100 | 2 x 5 | 20 | 0.2 | 120 | ---- |

In accordance with the foregoing table in order to obtain a direct reading or constant meter reading of zero to indicate a continuous concentration of 10 gamma (H) per liter the platinum electrode size should be 1 x 5 cm., using 0.1 ml. bromine in 100 ml. of borate solution containing 0.04 M. boric acid and 0.05 M. sodium hydroxide, with no shunt resistance for the meter. Under these same conditions, a constant meter reading of about 20 to 25 indicates a continuous concentration of about 5 gamma (H) per liter, and a reading of 45 on the meter indicates substantially zero concentration of (H). A short lag may occur in the meter becoming constant when the gas (H) in concentration is doubled or halved, but a deviation from a constant concentration is promptly indicated.

Titrating electrodes made of the same sample of platinum gauze gives concordant readings, other conditions being equal. They may be used for many days without change and appears possible to use them in the apparatus without calibration. In any event dependable results have been obtained by calibration on a concentration which falls near the middle of the range to be covered.

By using the constant flow of gaseous titrating reagent, the apparatus may be employed to automatically indicate a deviation from a desired concentration of agent by the deflection of the meter, and this deflection may be registered automatically through a photoelectric cell to a warning signal or through a suitable means for obtaining a correction in the concentration.

Other types of recorders may be used such as a kymograph in a simple electronic timing circuit or a tape recorder similar to telegraphic ticker tape recorders.

Any type of suitable time delay relay or condenser discharge relay may be substituted for the cam timer. When the automatic titrator or titrimeter is used with a time delay relay, the wiring may be arranged so that the start of a new sampling or collection period is directly after a preceding titration period, the collection period being regulated by setting the time delay relay. With the photo-cell and the time delay relay in series, the titration can not take place when either one of these systems keeps the circuit of the burette valve magnet open as illustrated with respect to the cam timer system.

The apparatus described has a large field of application in measuring and controlling chemical compositions. An automatic analyzer is provided which gives mechanization or motorization of manuel routines. The apparatus requires very little skill for operation. It requires very little space and can be made portable. It has been found to be extremely useful in the determinations of toxic agents with complete safety to the operator and has been found to give reliable results.

The automatic titrator is useful in acidimetry, alkalimetry, iodometry, oxidation-reduction, and other types of volumetric analyses in which the end point of reaction between a standard solution and a constituent to be determined in a known volume of a sample is indicated by galvanometric measurements.

Although the invention has been described with reference to certain specific applications and several modifications, it is to be understood that it is applicable to other types of determinations and with various other modifications as will be understood by those skilled in the art.

I claim:

1. In the field of electro-chemical analysis, the method consisting of making rapid and accurate quantitative determinations of the concentration of a physiologically harmful agent in a sample of air remote from the analyst, said agent consisting of one of the group of agents consisting of dichloroethyl sulphide, lewisite, phosgene and diphenylaminechloroarsine, said method comprising pumping a stream of said sample directly from the ambient atmosphere at a constant low flow rate of between from about 0.2 to about 2.0 liters per minute into a titrating half cell sulfuric acid electrolyte maintained at a substantially constant volume in contact with a titrating electrode selected from the group of electrodes consisting of platinum foil and sponge platinum and with a silver nitrate electrolyte in a reference half cell having a silver foil reference electrode, flowing gravitationally down into said titrating electrolyte at a constant low flow rate simultaneously with said sample a definite low concentration of a reagent selected from the group of reagents consisting of bromine and chlorine, maintaining the electrolyte of the reference half cell at substantially constant volume and composition in contact with said reference electrode, said reference electrode having a fixed difference in potential with respect to the titrating electrode when the same definite low concentration of said reagent is passed into the titrating electrolyte with pure air at the same constant flow rates as in the analysis and establishing a final difference in potential between said electrodes by supplying the sample to the titrating electrolyte simultaneously with the definite low concentrations of said reagent at their constant low flow rates, the change between the fixed and final differences in potential being approximately proportional to the concentration of the agent in the sample and being electrically indicated at a position remote from said half cells on a galvanometer electrically connected by conductors to said electrodes.

2. The method of claim 1 in which the reagent is bromine.

3. The method of claim 1 in which the agent is dichloroethyl sulfide.

4. The method of claim 1 in which the agent is lewisite.

5. The method of claim 1 in which the agent is phosgene.

6. The method of claim 1 in which the agent is diphenylamine chloroarsine.

7. In the field of electro-chemical analysis, the method consisting in making rapid and accurate quantitative determinations of the concentration of a physiologically harmful agent in a sample of air remote from the analyst, said agent consisting of one of the group of agents consisting of dichloroethyl sulphide, lewisite, phosgene and diphenylaminechloroarsine, said method comprising pumping a stream of said sample directly from the ambient atmosphere at a constant low flow rate of between from about 0.2 to about 2.0 liters per minute into a titrating half cell sulfuric acid electrolyte maintained at a substantially constant volume in contact with a titrating electrode selected from the group of electrodes consisting of platinum foil and sponge platinum and with a silver nitrate electrolyte in a reference half cell having a silver foil reference electrode, flowing gravitationally down into said titrating electrolyte at a constant low flow rate simultaneously with said sample a definite low concentration of a reagent consisting of bromine, maintaining the electrolyte of the reference half cell at substantially constant volume and composition in contact with said reference electrode having a fixed difference in potential with respect to the titrating electrode when the same definite low concentration of said reagent is passed into the titrating electrolyte with pure air at the same constant flow rates as in the analysis and establishing a final difference in potential between said electrodes by supplying the sample to the titrating electrolyte simultaneously with the definite low concentrations of said reagent at their constant low flow rates, the change between the fixed and final differences in potential being approximately proportional to the concentration of the agent in the sample and being electrically indicated at a position remote from said half cells on a galvanometer electrically connected by conductors to said electrodes.

8. The method of claim 7 in which the agent is dichloroethyl sulfide.

9. The method of claim 7 in which the agent is lewisite.

10. The method of claim 7 in which the agent is phosgene.

11. The method of claim 7 in which the agent is diphenylamine chloroarsine.

12. In the field of electro-chemical analysis, the method consisting in making rapid and accurate quantitative determinations of the concentration of a physiologically harmful agent is a sample of air remote from the analyst, said agent consisting of one of the group of agents consisting of dichloroethyl sulphide, lewisite, phosgene and diphenylaminechloroarsine, said method comprising pumping a stream of said sample directly from the ambient atmosphere at a constant low flow rate of between from about 0.2 to about 2.0 liters per minute into a titrating half cell sulfuric acid electrolyte maintained at a substantially constant volume in contact with a titrating electrode selected from the group of electrodes consisting of platinum foil and sponge platinum and with a silver nitrate electrolyte in a reference half cell having a silver foil reference electrode, flowing gravitationally down into said titrating electrolyte at a constant low flow rate simultaneously with said sample a definite low concentration of a reagent chlorine, maintaining the electrolyte of the reference half cell at substantially constant volume and composition in contact with said reference electrode, said reference electrode having a fixed difference in potential with respect to the titrating electrode when the same definite low concentration of said reagent is passed into the titrating electrolyte with pure air at the same constant flow rates as in the analysis and establishing a final difference in potential between said electrodes by supplying the sample to the titrating electrolyte simultaneously with the definite low concentrations of said reagent at their constant low flow rates, the change between the fixed and final differences in potential being approximately proportional to the concentration of the agent in the sample and being electrically indicated at a position remote from said half cells on a galvanometer electrically connected by conductors to said electrodes.

13. The method of claim 12 in which the agent is dichloroethyl sulfide.

14. The method of claim 12 in which the agent is lewisite.

15. The method of claim 5 in which the agent is phosgene.

16. The method of claim 6 in which the agent is diphenylamine chloroarsine.

References Cited in the file of this patent

UNITED STATES PATENTS

| | | |
|---|---|---|
| 1,340,649 | Crandon | May 18, 1920 |
| 1,530,833 | Keeler | Mar. 24, 1925 |
| 2,024,819 | Ehrhardt | Dec. 17, 1935 |
| 2,114,234 | Ornstein et al. | Apr. 12, 1938 |
| 2,156,693 | Jacobson | May 2, 1939 |
| 2,278,248 | Darrah | Mar. 31, 1942 |
| 2,370,871 | Marks | Mar. 16, 1945 |

FOREIGN PATENTS

| | | |
|---|---|---|
| 302,490 | Great Britain | Dec. 20, 1928 |
| 885,615 | France | May 31, 1943 |

OTHER REFERENCES

Kolthoff et al.: Potentiometric Titrations, by John Wiley & Sons, pub. in 1931, 2nd ed., pp. 104–08.

Gluckauf et al.: Jour. of the Chem. Soc., London (1944), "A Method for the Continuous Measurement of the Local Concentration of Atmospheric Ozone," pp. 1–4, received in Patent Office Library May 1, 1944.